(12) United States Patent
Nguyen (10) Patent No.: US 7,504,931 B2
(45) Date of Patent: Mar. 17, 2009

(54) REMOTE FEEDBACK FOR VEHICLE KEY FOB FUNCTIONS

(75) Inventor: Huan T. Nguyen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 303 days.

(21) Appl. No.: 11/360,935

(22) Filed: Feb. 23, 2006

(65) Prior Publication Data

US 2006/0220806 A1  Oct. 5, 2006

Related U.S. Application Data (60) Provisional application No. 60/662,407, filed on Mar. 16, 2005.

(51) Int. Cl.
*B60R 25/10* (2006.01)

(52) U.S. Cl. .............. 340/426.36; 340/426.15; 340/426.16

(58) Field of Classification Search ............ 340/539.11, 340/539.13, 539.14, 539.16, 539.25, 425.5, 340/426.18, 426.35, 539.23, 426.13, 426.15, 340/426.16, 426.36; 455/569.1, 569.2, 456.1; 701/1, 213; 307/10.1
See application file for complete search history.

(56) References Cited

U.S. PATENT DOCUMENTS

| | | | | |
|---|---|---|---|---|
| 6,130,622 A | * | 10/2000 | Hussey et al. | 340/5.61 |
| 6,265,984 B1 | * | 7/2001 | Molinaroli | 340/815.4 |
| 6,526,335 B1 | * | 2/2003 | Treyz et al. | 701/1 |
| 6,792,295 B1 | * | 9/2004 | Hanevich et al. | 455/569.1 |
| 7,188,005 B2 | * | 3/2007 | Toba et al. | 701/1 |
| 7,239,226 B2 | * | 7/2007 | Berardi et al. | 340/5.61 |
| 2004/0006426 A1 | * | 1/2004 | Armstrong et al. | 701/213 |
| 2005/0099275 A1 | * | 5/2005 | Kamdar et al. | 340/426.18 |
| 2006/0061458 A1 | * | 3/2006 | Simon et al. | 340/426.35 |
| 2006/0293802 A1 | * | 12/2006 | Kitao et al. | 701/2 |

* cited by examiner

*Primary Examiner*—Van T. Trieu (57) ABSTRACT

Methods and apparatus are provided for controlling operation of a vehicle. The apparatus includes, but is not limited to, an input configured to receive an action of the operator that is indicative of the operation to be performed by the vehicle and a transmitter that is configured to send a first signal via a wireless connection with the vehicle that at least partially embodies a command for the action of the operator received by the input. In addition, the apparatus comprises a receiver configured to receive a second signal via the wireless connection with the vehicle that at least partially embodies feedback from a sensor of the vehicle indicative of the operation resulting from the command at least partially embodied by the first signal sent by the transmitter. Furthermore, the apparatus comprises an output configured to present information to the operator on the operation based at least in part on the feedback in the second signal received by the receiver.

4 Claims, 10 Drawing Sheets

REMOTE FEEDBACK FOR VEHICLE KEY FOB FUNCTIONS

CROSS-REFERENCES TO RELATED APPLICATIONS

This application claims the benefit of U.S. Provisional Application No. 60/662,407, filed Mar. 6, 2005.

TECHNICAL FIELD

The present invention generally relates to remote activation and control and, more particularly, vehicle remote activation and control with status feedback to a remote controller.

BACKGROUND OF THE INVENTION

It is well known in the art to provide remote activation devices, especially in connection with vehicles. These often take the form of a small electronic fob that can be conveniently carried by the vehicle operator, to which the vehicle operator can conveniently attach the vehicle keys, although that is not essential. The fob usually contains a radio transmitter that communicates with a receiver and control system of the vehicle. For example, when the user activates an "unlock" button on the fob, the fob sends a radio message to the vehicle control system, which then causes one or more of the door locks to open.

Figure 1:
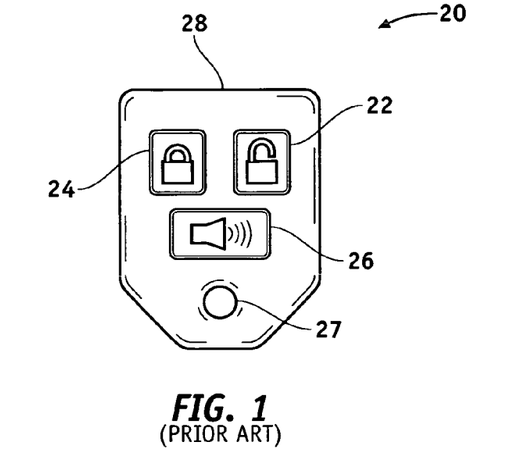
FIG. 1 is a simplified plan view of a vehicle fob according to the prior art.
Figure 2:
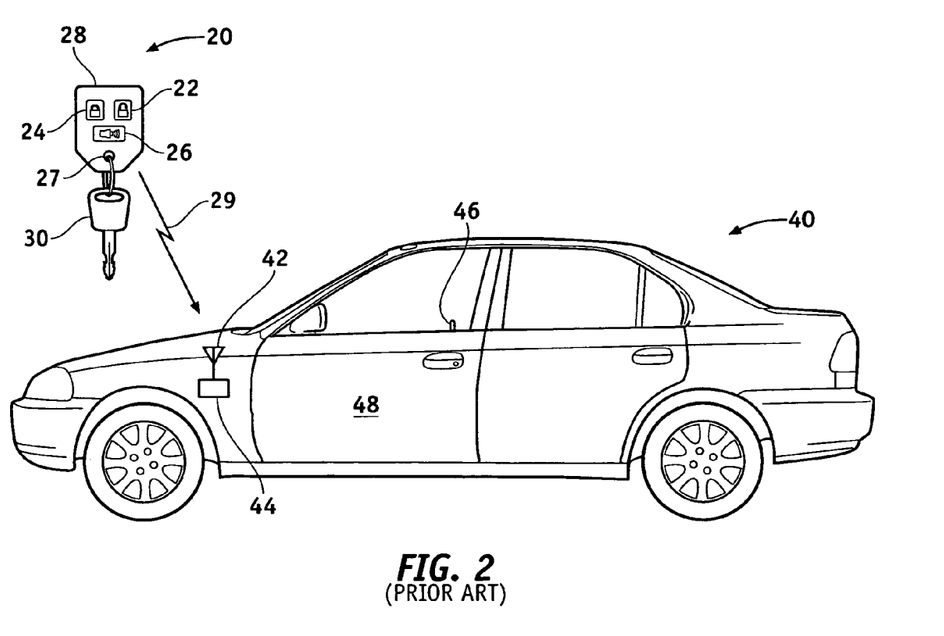
FIG. 2 illustrates the fob of FIG. 1 interacting with a vehicle according to the prior art.

FIG. 1 illustrates such a prior art fob 20 that includes, but is not limited to, "unlock" function button 22, "lock" function button 24, "alarm" function button 26 and key attachment aperture 27 in fob case 28. FIG. 2 illustrates fob 20 interacting with vehicle 40. Key 30 is conveniently attached to fob 20 via attachment aperture 27. When one or the other of function buttons 22, 24, 26 on fob 20 is depressed or otherwise activated by the user, fob 20 sends wireless command signal 29 to nearby vehicle 40 where it is received by antenna 42 coupled to vehicle control system 44. Control system 44 interprets command signal 29 received from fob 20 and, depending upon which of functions 22, 24, 26 has been activated by the user, causes the corresponding vehicle sub-system to respond. For example, if "unlock" button 22 has been activated, then control system 44 causes lock 46 on door 48 to move from a locked to an unlocked position. The prior art systems are not limited to merely the unlock, lock and alarm functions illustrated in FIGS. 1-2, but may perform other functions as well (e.g., engine start, lights ON/OFF, open trunk, etc.). Nevertheless, there continues to be a need for additional functions and other improvements for remote control systems, especially for vehicles applications.

Accordingly, it is desirable to provide an improved remote control apparatus and method for use with vehicles. In addition, it is desirable that the remote control and feedback apparatus and method be simple, rugged, reliable and take advantage of existing system elements within the vehicle and elsewhere. Furthermore, other desirable features and characteristics of the exemplary embodiment of the present invention will become apparent from the subsequent detailed description and the appended claims, taken in conjunction with the accompanying drawings and the foregoing technical field and background.

SUMMARY OF INVENTION

A portable control device is provided in accordance with an exemplary embodiment of the present invention that is configured to provide an operator with control of an operation of a vehicle. The portable control device comprise an input configured to receive an action of the operator that is indicative of the operation to be performed by the vehicle and a transmitter that is configured to send a first signal at least partly via a wireless connection with the vehicle that at least partially embodies a command for the action of the operator received by the input. In addition, the portable control device comprises a receiver configured to receive a second signal at least partly via the wireless connection with the vehicle that at least partially embodies feedback from a sensor of the vehicle indicative of the operation resulting from the command at least partially embodied by the first signal sent by the transmitter. Furthermore, the portable control device comprises an output configured to present information to the operator on the operation based at least in part on the feedback in the second signal received by the receiver.

In addition to the portable device, a system, which includes a control device, is provided in accordance with an exemplary embodiment of the present invention that is configured to provide an operator with control of an operation of a vehicle. The control device comprises an input configured to receive an action of the operator that is indicative of the operation to be performed by the vehicle, a first transmitter configured to send a first signal that at least partially embodies a command for the action of the operator received by the input, and a first receiver configured to receive a second signal that at least partially embodies feedback indicative of the operation resulting from the command at least partially embodied by the first signal sent by the first transmitter. The control device also comprises an output configured to present information to the operator based at least in part on the feedback in the second signal received by the receiver. The system also comprises an electronic control system substantially affixed to the vehicle that is configured for connection to the control device via an at least partly wireless connection. The electronic control system comprises a second receiver configured to receive the first signal from the first transmitter via the at least partly wireless connection, a controller configured to receive the command in the first signal sent by the first transmitter and further configured to generate a third signal that controls the operation of the vehicle. In addition, the electronic control system comprises a sensor configured to generate the feedback indicative of the operation resulting from the third signal generated by the controller and a second transmitter configured to send the second signal with the feedback to the first receiver via the at least partly wireless connection.

In addition to the portable control device and the system, a method is provided for operating a portable control device, which is configured to provide an operator with control of an operation of a vehicle, in accordance with an exemplary embodiment of the present invention. The method comprises sensing an input provided to the portable control device by the operator that is indicative of the operation to be performed by the vehicle and transmitting a first signal to the vehicle via an at least partly wireless connection that at least partially embodies a command for the operation to be performed by the vehicle. Furthermore, the method comprises receiving a second signal from the vehicle via the at least partly wireless connection that at least partially embodies feedback from the vehicle indicative of the operation and generating an output that presents information to the operator on the operation based at least in part on the feedback.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 3:
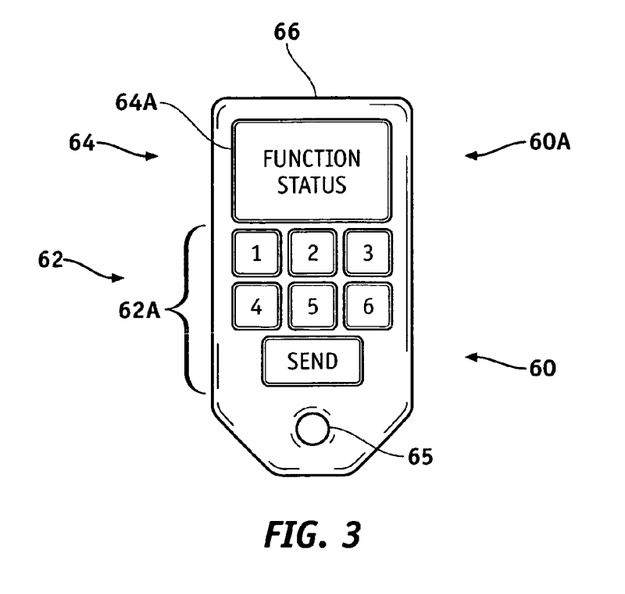
FIG. 3 is a simplified plan view of a vehicle control device, which can also be referred to as a fob, according to an exemplary embodiment of the present invention.

FIG. 3 is a simplified plan view of a vehicle control device 60, which shall also be referred to herein as a fob, in accordance with an exemplary embodiment of the present invention. As also used herein, a vehicle control device or fob is intended to include remote control serving any number of purposes. For example, the fob can also act as a key-ring, cell phone, and/or portable computer.

Figure 5:
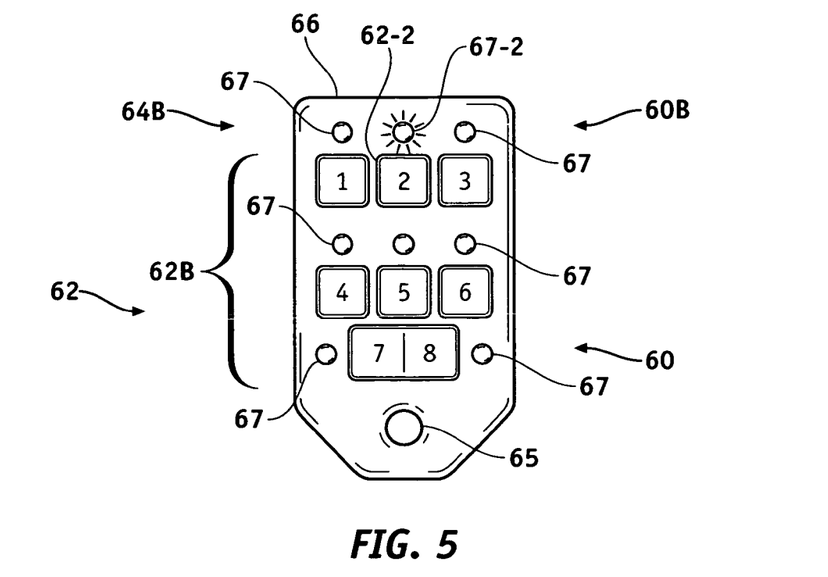
FIGS. 5-8 are simplified plan views of the vehicle control device in accordance with other exemplary embodiments of the present invention.

For convenience of description, reference number 60A is used to refer particularly to fob 60 of FIG. 3 and reference number 60B is used to refer particularly to fob 60 of FIG. 5. In addition, reference number 60C is used to refer to fob 60 of FIG. 6. Furthermore, reference number 60D is used to refer to fob 60 of FIG. 7 and reference number 60E is used to refer to fob 60 of FIG. 8.

Figure 4:
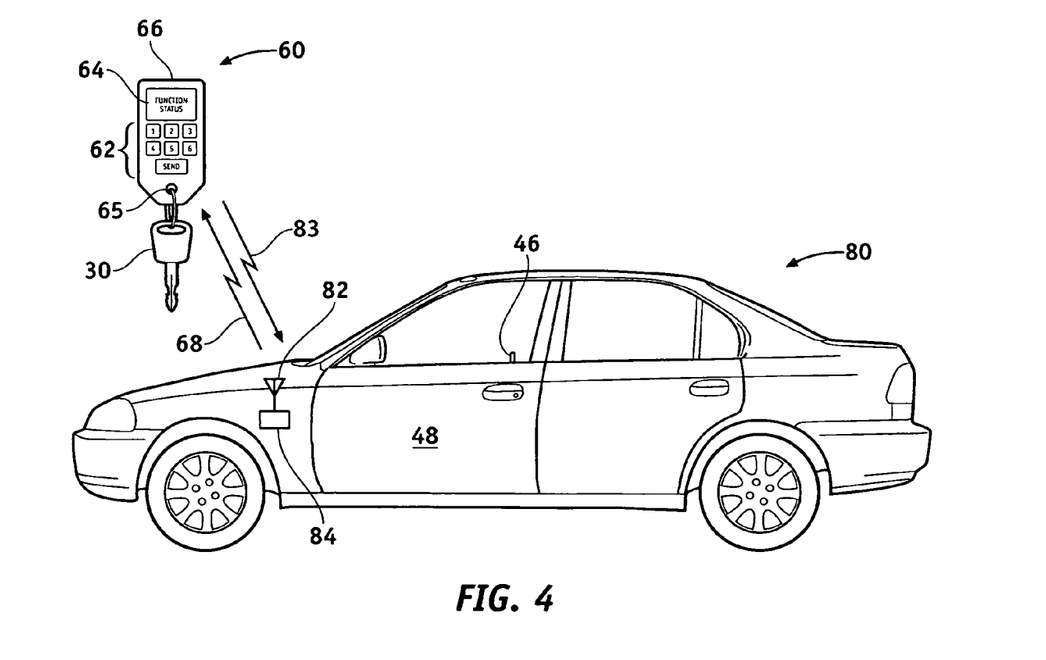
FIG. 4 illustrates the fob of FIG. 3 interacting with a vehicle according to an exemplary embodiment of the present invention.

FIG. 4 illustrates fob 60 interacting with vehicle 80. Fob 60 includes, but is not limited to, various command function buttons, switches, microphones, and/or other actuators 62. Moreover, fob 60 includes, but is not limited to, function status display or audio annunciator 64, and optional aperture 65 in fob body 66 for object attachment, such as attachment of one or more keys 30.

For convenience of description, reference number 62 is used to generally refer to the input elements of fob 60. Also, reference numbers 62A-62E are used to generally refer to the particular input elements illustrated in FIGS. 3-8, respectively. Similarly, reference number 64 is used to generally refer to the output display(s) and/or annunciator(s) of fob 60 and reference numbers 64A-64E are used to generally refer to the arrangements particularly illustrated in FIGS. 3-8, respectively.

In fob 60A, display or annunciator 64A is a Liquid Crystal Display (LCD), and in this example an LCD alphanumeric display, although other configurations and devices can be utilized in accordance with the present invention. As used herein the terms display and LCD are intended to include other alternatives for presenting visual information. Accordingly, any type of visually perceivable display may be used for display 64A. Moreover, display 64A can be used as an input device for selection and activation by the user.

Function buttons, switches or actuators 62A of fob 60A are numbered 1-6 with a seventh button, switch or actuator identified as SEND. However, these identifications are merely for convenience of explanation and are not intended to be limiting. The numbers 1-6 and SEND can be replaced by symbols that will assist the user with recognition of the function commanded by a particular button, switch or actuator. Further, the use of a separate SEND button or switch to initiate transmission of a fob command to vehicle 80 is not essential, since transmission may be arranged to occur directly upon actuating the desired command button or switch itself. The exact nature of the symbol or marking on a particular button, switch or actuator is not critical to the exemplary embodiments of the present invention. Further, more or fewer than seven function buttons, switches or actuators may be included in fob 60.

As will be subsequently explained, a microphone can also be included to provide for voice activation. As used herein the words "input", "button", "switch" and "actuator" with reference to fob 60 are used interchangeably to indicate any convenient means of selecting and/or initiating a command signal from fob 60. For example, and without limitation, actuators 62 may be pressure actuated switches, optical sensors, or capacitive sensors that detect the presence or absence of a finger or stylus touching or approaching the actuators, magnetic switches, a voice activated microphone, and so forth. The exemplary embodiment of the present invention is independent of the exact nature and means of operation of buttons, switches or actuators 62, and all possible means of selecting and/or initiating a command signal from fob 60 are intended to be included in the exemplary embodiments of the present invention.

Activating one or more of switches or other input means 62 causes fob 60 to send wireless signal 68 to vehicle 80 where it is received by antenna 82, which is coupled to Vehicle Electronics System (VES) 84 as shown in FIG. 4. As will be subsequently described in more detail, vehicle electronics system 84 executes the command received via signal 68 and sends various response signals 83 back to fob 60. For example, the various response signals 83 sent back to the fob 60 can be an intermediate status and/or execute completion signals that are then displayed or announced in whole or in part via status display 64 of fob 60A. In this way, the user of fob 60A knows by means of the information presented on status display or annunciator 64A, or equivalent annunciators illustrated in FIGS. 5-8, that the function command issued using fob 60A has been carried out. Furthermore, any intermediate execution values or other feedback information concerning the particular function being requested using fob 60A can also be presented on annunciator or display 64A.

Figure 6:
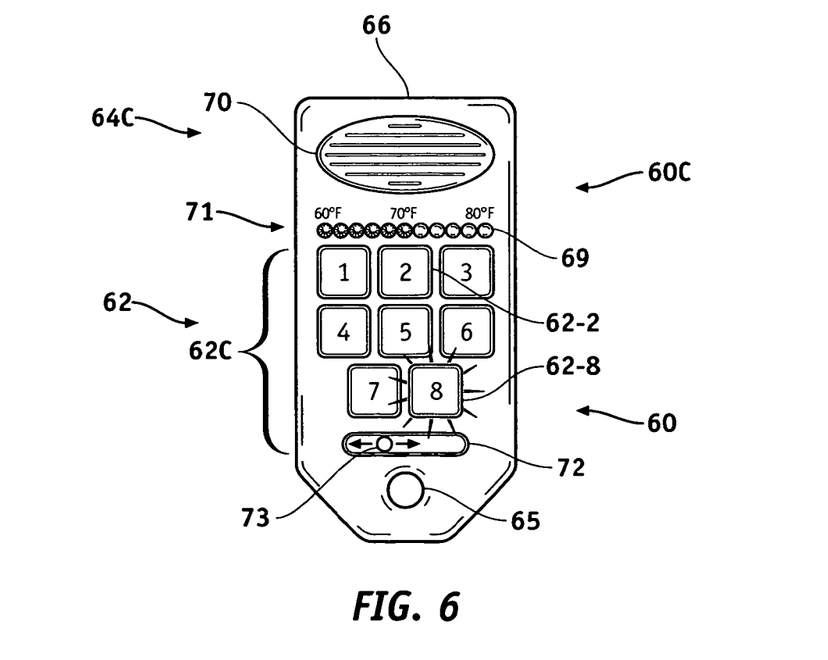
Figure 7:
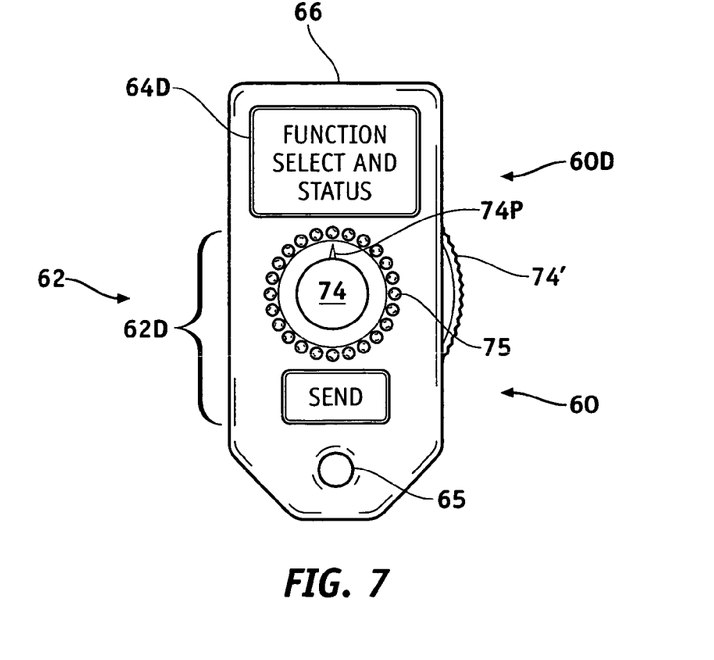
Figure 8:
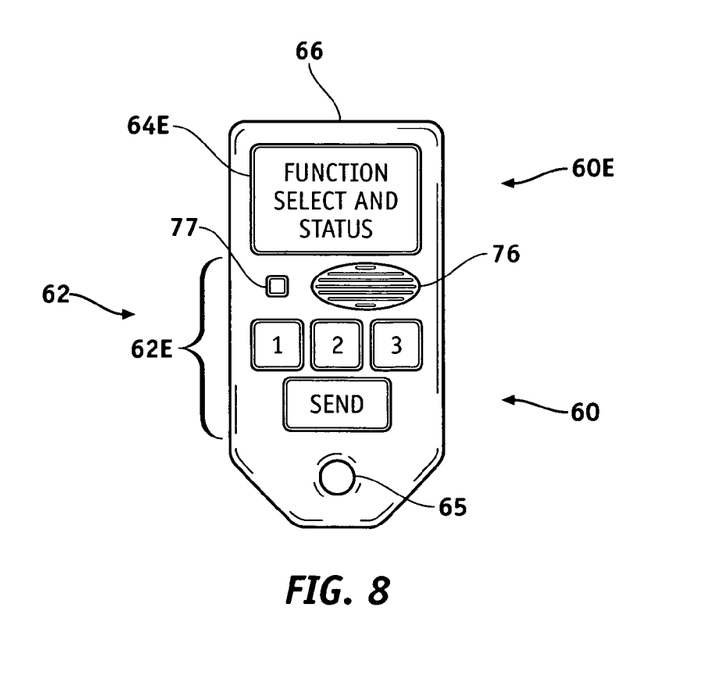

FIGS. 5-8 are simplified plan views of vehicle remote control and feedback fobs 60 according to further exemplary embodiments of the present invention. More particularly, fob 60B is shown in FIG. 5, fob 60C is shown in FIG. 6, fob 60D is shown in FIG. 7, and fob 60E is shown in FIG. 8. Generally, fobs 60A, 60B, 60C, 60D, 60E differ in the manner in which the desired commands to be sent to vehicle electronics system 84 are entered into fob 60 and/or the manner in which the information in feedback signals 83 is presented to the user.

For example, fob 60B of FIG. 5 has various indicator lights 67 instead of LCD status display 64A that can be a single color or multiple colors. One or more of lights 67 could also be shared by the various switches. Suppose, for example, that depressing switch 62-2 directs an engine start and corresponding command signal 68 is sent to vehicle system 84, then after vehicle electronics system 84 has started the engine, it sends successful completion feedback via signal 83 to fob 60B. Reception of successful completion feedback via signal 83 by fob 60B preferably causes a light, such as a Light Emitting Diode (LED) 67-2, to illuminate in a first mode (e.g., first color) to indicate that the command was successfully carried out. Conversely, if the engine failed to start (e.g., the engine speed sensor reads zero after the start sequence is finished), then system 84 sends an unsuccessful completion feedback via signal 83 back to fob 60B, and a light, such as light 67-2, illuminates in another mode (e.g., illuminates in a color other than the first color) or otherwise indicates that the desired function was not completed successfully. In this manner, the results of any particular function command can be communicated back to the user.

Fob 60B illustrates a further variation in accordance with an exemplary embodiment of the present invention, in which buttons or switches 62B numbered 1-6 are push or touch type switches and switch numbered 7-8 is a rocker type switch, indicating that fob 60 may include any type of actuator switch. While lights 67 are shown in FIG. 5 as being separate from switches 62B, the lights 67 may be interior to or incorporated within switches 62B. This is particularly convenient where switches 62 are labeled with symbols indicative of the function and assists in viewing in a reduced light environment.

Fob 60C of FIG. 6 illustrates alternate feedback displays or annunciators that are provided in accordance with an exemplary embodiment of the present invention. More specifically, fob 60C includes speaker or annunciator 70 adapted to provide audible feedback to the user based on feedback signals 83 received from vehicle 80. For example, assuming that push-button 62-2 causes fob 60 to transmit an engine start command, then when feedback signal 83 is received from vehicle 80 as shown in FIG. 4, audio speaker 70 will announce "engine start successful" or "engine start unsuccessful," as the case may be.

By way of further illustration, suppose that fob 60 has sent an environmental control function command, then depending upon the nature of the command, vehicle electronics system 84 may send back the current inside temperature, outside temperature, whether rain is detected by the vehicle rain sensor, whether the air conditioning system is running, and so forth, which result can be announced via speaker 70. The various messages and announcements to be provided by speaker 70 are preferably pre-determinable and hence can be conveniently, but not essentially, stored in a memory of the fob 60. In this way, feedback signal 83 need not actually contain the message itself, but only an address or point to an appropriate message that can be retrieved from memory and then audibly played, visually displayed, or both.

Fob 60C of FIG. 6 illustrates a further variation of an exemplary embodiment of the present invention that utilizes light bar 69. In this exemplary embodiment, light bar 69 is a row of LEDs or other emitters that progressively illuminate in response to particular feedback signals from vehicle 80. In this particular example shown, light bar 69 indicates that the inside vehicle temperature is about 70 Fahrenheit (° F.) on a scale of 60-80° F. as shown by legend 71.

In this exemplary embodiment, fob 60C is also provided with variable control 72 having movable slider 73 so that the user can input different values of a desired variable in an analog like fashion. For example, depressing switch 62-8 can cause fob 60C to enter a "select temperature value" mode. In this case, it is convenient that at least switch 62-8 have an interior light so that it flashes when in this mode as shown in FIG. 6. When switch 62-8 is flashing, moving slider 73 is configured to cause light bar 69 to progressively illuminate to indicate a desired vehicle interior temperature. Once the desired temperature has been selected using the combination of slider 73 and light bar 69, a second activation of button 62-8 turns off the flashing mode of switch button 62-8 and causes the selected temperature to be sent to vehicle 80 for execution via signal 68. The foregoing example is intended to be illustrative of a possible additional mode of operation of the exemplary embodiment of the present invention and not intended to be limiting.

Fob 60D of FIG. 7 illustrates a further variation of fob 60 of an exemplary embodiment of the present invention. In this variation, display 64D facilitates command function selection as well as displaying the results of command execution by vehicle electronics system 84. Switch 74, 74' is provided with each angular position of switch 74, 74' corresponding to a particular function that can be commanded on vehicle 80. A list of available function commands is conveniently presented on display 64. Rotating pointer 74P of switch 74, 74' to any particular function position 75 causes the function to be highlighted on display 64D. Thus, user rotation of rotating switch 74, 74' can be used to scan through the available command functions and select that which is desired by, for example, pressing SEND. The SEND function could also be incorporated as part of the dial wheel 74, 74'. Rotating switch or dial-wheel 74, 74' may be mounted on the face of fob case 66 as shown by reference number 74 or protrude through the side of case 66 as shown by reference number 74'.

Fob 60E of FIG. 8 illustrates a further variation of fob 60 of the exemplary embodiment of the present invention. In this variation, input 62E includes microphone 76 for receiving spoken commands (i.e., voice activation of fob 60E). For example, pressing switch 77 energizes microphone 76. As with fob 60D of FIG. 7, display 64E of fob 60E can be used to list the available commands, allowing the user to select the desired command by voice activation. Other switches can also be provided as illustrated in fob 60E, but this is not essential. Display 64E also presents the feedback received from vehicle electronics system 84 so that the user may confirm execution or failure of the command sent to vehicle 80. These are but a few examples of the many functions and parameters that can be initiated, measured, set, controlled and/or reported by remote fob 60 and vehicle electronics system 84 of the exemplary embodiment of the present invention.

While fobs 60A. 60B, 60C, 60D, 60E in FIGS. 3-8 have been illustrated as having particular combinations of function selections means or parameter selection means (e.g., buttons, switches, sliders, dial-wheels, microphones, etc.) and various feedback means (e.g., alphanumeric display, signal lights, light bars, audio output, etc.), the present invention is not limited to merely one combination or the other as implicitly or explicitly referred to in this detailed description. Rather, any combination of input and output elements may be used in the fob of the exemplary embodiment of the present invention according to the needs of the system designer and user. For example, an audio speaker and an alphanumeric display may be used in the same fob, a light-bar like display element may be included in the alphanumeric display or separately, some switch actuators may illuminate and others not, sliders or rotating knobs or dial-wheels or volume or analog controls may be incorporated in the main faces and/or on the sides of case 66 as needed, and so forth. It is intended that all such combinations and variations be included in the exemplary embodiment of the present invention.

For simplicity, the antenna or antennas that transmit and receive wireless signals 68, 83 from and to fobs 60 are omitted in FIGS. 3-8. The particular types of antennas will depend upon the signaling frequencies and protocols chosen by the designer and user. Suitable antennas are well known in the art and are shown schematically in FIGS. 9-11.

Figure 9:
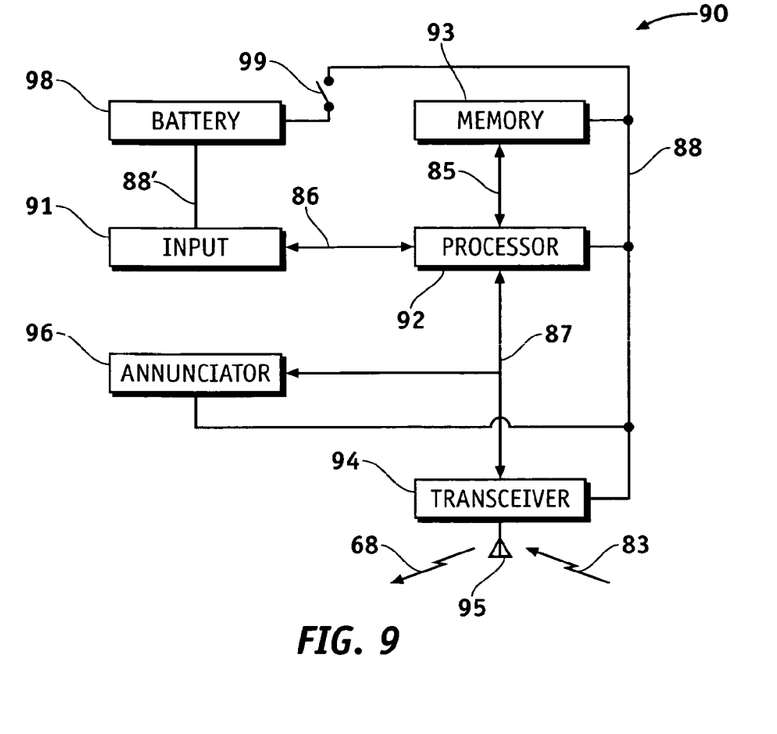
FIG. 9 is a simplified electrical schematic block diagram of the vehicle control devices of FIGS. 3-8 according to an exemplary embodiment of the present invention.

FIG. 9 is a simplified electrical schematic block diagram of electronic system 90 of fob 60 of FIGS. 3-8 according to an exemplary embodiment. Fob electronics system 90 includes, but is not limited to, input 91 (e.g., switches 62, slider 73, rotary selection knob 74, 74', microphone 76, etc.), signal processor or controller 92, memory 93, transceiver 94 (i.e., transmitter/receiver) with antenna 95, annunciator 96 (e.g., displays and/or lights 64, 67, 69, speaker 70, etc.) and battery or other energy storage means 98. Input 91 is coupled to processor 92 via bus or leads 86. Processor 92 is coupled to memory 93 by bus or leads 85 and to transceiver 94 and annunciator 96 by bus or leads 87. Annunciator 96 may include, but is not limited to, any of the various forms of output elements and input 91 may include any of the various input elements discussed in connection with fobs 60 of FIGS. 3-8. Power is supplied to the various elements by DC power leads 88, 88'. Battery switch 99 is desirable, but not essential, to permit battery 98 to be disconnected when fob 60 is not in use. Battery switch 99 may be incorporated into input 91 so that when any switch or other element 62 in input 91 is activated, switch 91 closes and supplies power to the various elements of fob electronics system 90. A time-out circuit (not shown) is desirably included, so that switch 99 opens automatically after a predetermined period of non-use.

As has been previously described, when the user activates a particular selection (e.g., switch 62, 73, 74, 74', 76, voice commands, etc.) of input 91 corresponding to a predetermined vehicle action or function to be carried out (e.g., door (s) lock/unlock; engine start/stop; window(s) up/down; trunk open/close; environmental control on/off; temperature up/down; lights on/off; rain detect on/off, wipers on/off, alarm arm/disarm; alarm on/off, top down/up, and so forth), processor 92 generates the corresponding function command, which it passes to transceiver 94. Transceiver 94 generates modulated wireless signal 68 for transmission to vehicle electronics system 84 via antennas 95, 82. The command transmitted via wireless signal 68 is conveniently in coded form to minimize the signal duration and power. Any suitable signaling method and protocol may be used such as Bluetooth®, 802.11, WiFi, Zigbee, and so forth. However, transmission by modulated RF signals is preferable.

Figure 10:
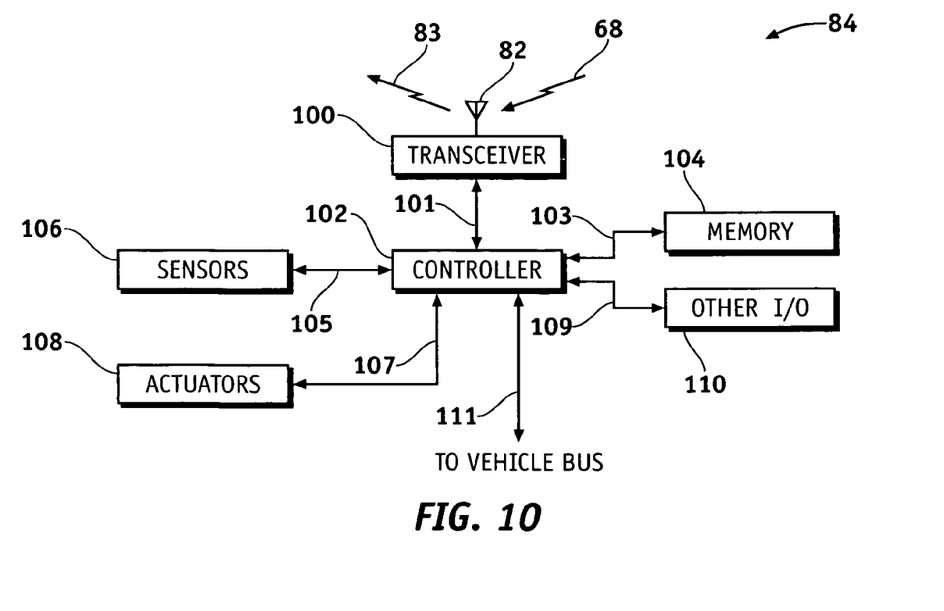
FIG. 10 is a simplified electrical schematic block diagram of a vehicle electronics system according to an exemplary embodiment of the present invention.

FIG. 10 is a simplified electrical schematic block diagram of vehicle electronics system (VES) 84 with which fob 60 communicates via vehicle antenna 82. System 84 includes, but is not limited to transceiver 100, controller 102, memory 104, sensors 106, actuators 108 and optional other input 110. Antenna 82 is coupled to transceiver 100, which is in turn coupled to controller 102 via bus or leads 101. Controller 102 is coupled to memory 104 via bus or leads 103, to sensors 106 via bus or leads 105, to actuators 108 via bus or leads 107 and to optional other input/output (I/O) 110 via bus or leads 109. While bus or leads 101, 103, 105, 107, 109 are illustrated as coupling the various elements of VES 84 individually to controller 102, this is merely for convenience of description and not intended to be limiting. Some or all of elements 100, 102, 104, 106, 108, 110 can be coupled via a common bus. VES 84 may be self contained, that is, including both actuators 108 and sensors 106 needed to execute various commands received from fob 60 or alternatively act as a transfer agent for interpreting and forwarding fob commands to various Electronic Control Units (ECUs) elsewhere in the vehicle. In this mode of operation, controller 102 is conveniently interfaced to other vehicle electronic control units as per vehicle architecture via bus or leads 111. Either arrangement or a combination thereof is useful and numerous means can be utilized to accomplish such interconnection.

Transceiver 100 demodulates signal 68 received from fob 60 and passes the command contained in the signal 68 to controller 102. Controller 102 may also receive input commands via other I/O 110. Controller 102 interprets the received command according to data and instructions stored in memory 103 and energizes the appropriate actuators 108 to carry out the command or passes the command to another ECU via bus or leads 111. Controller 102 also interrogates sensors 106 to monitor progress of execution of the command received from fob 60 and to determine the completion state or, alternatively, obtains such data from other ECUs via bus or leads 111, depending on the mode of operation.

For example, when the command corresponds to an engine start, then controller 102 causes the engine start sequence stored in memory 104 to be performed and monitors, among other things, the engine Rotations Per Minute (RPM) sensor or a flag set by the RPM sensor to determine whether the engine start was successful. When the requested action or command has been completed, controller 102 causes the results to be reported back to the command source. Alternatively, controller 102 passes the engine start command to an ECU responsible for power train control, which issues the necessary local instructions to start the engine and passes the results back to controller 102. When the command originated in fob 60, then the feedback response is sent via signal 83 from transceiver 100 and antenna 82 of vehicle electronics system 84 to fob 60 where it is received by antenna 95 and transceiver 94. Transceiver 94 demodulates received signal 83 and passes the response contained in the signal to fob processor 92, which causes fob annunciator 96 to display the appropriate response or generate a sound corresponding to the appropriate response, or a combination of the two.

Figure 12:
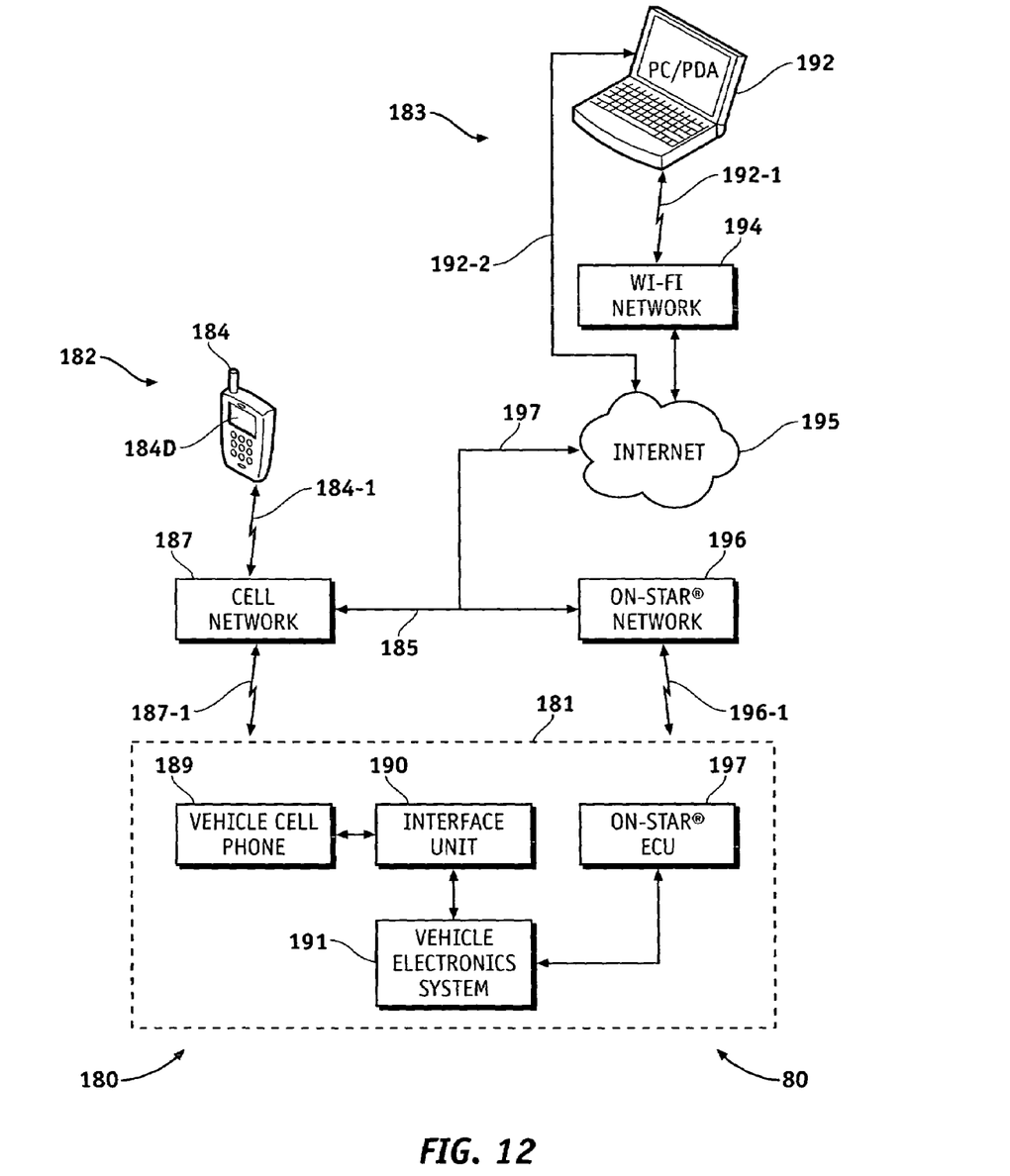
FIG. 12 is simplified functional block diagram of yet another exemplary embodiment of the present invention.

In the preferred exemplary embodiment, feedback signal 83 is a coded response, such as a memory address or equivalent, that fob processor 92 uses to retrieve the corresponding message to be displayed or announced by annunciator 96 from memory 93. A similar arrangement is used for signals 68 flowing from fob 60 to vehicle 80. This arrangement simplifies the wireless signal being exchanged between fob 60 and vehicle 80. When the command signal was received via other Input/Output (I/O) 110, then the resulting feedback signal is sent back via other I/O 110 as subsequently explained in greater detail in connection with FIG. 12. The end result of the signal exchange between fob 60 or other remote as shown in FIG. 12, and vehicle 80, is that the fob user can determine by reference to the fob itself or other remote whether or not the requested command was properly executed and/or the desired vehicle status.

Figure 11:
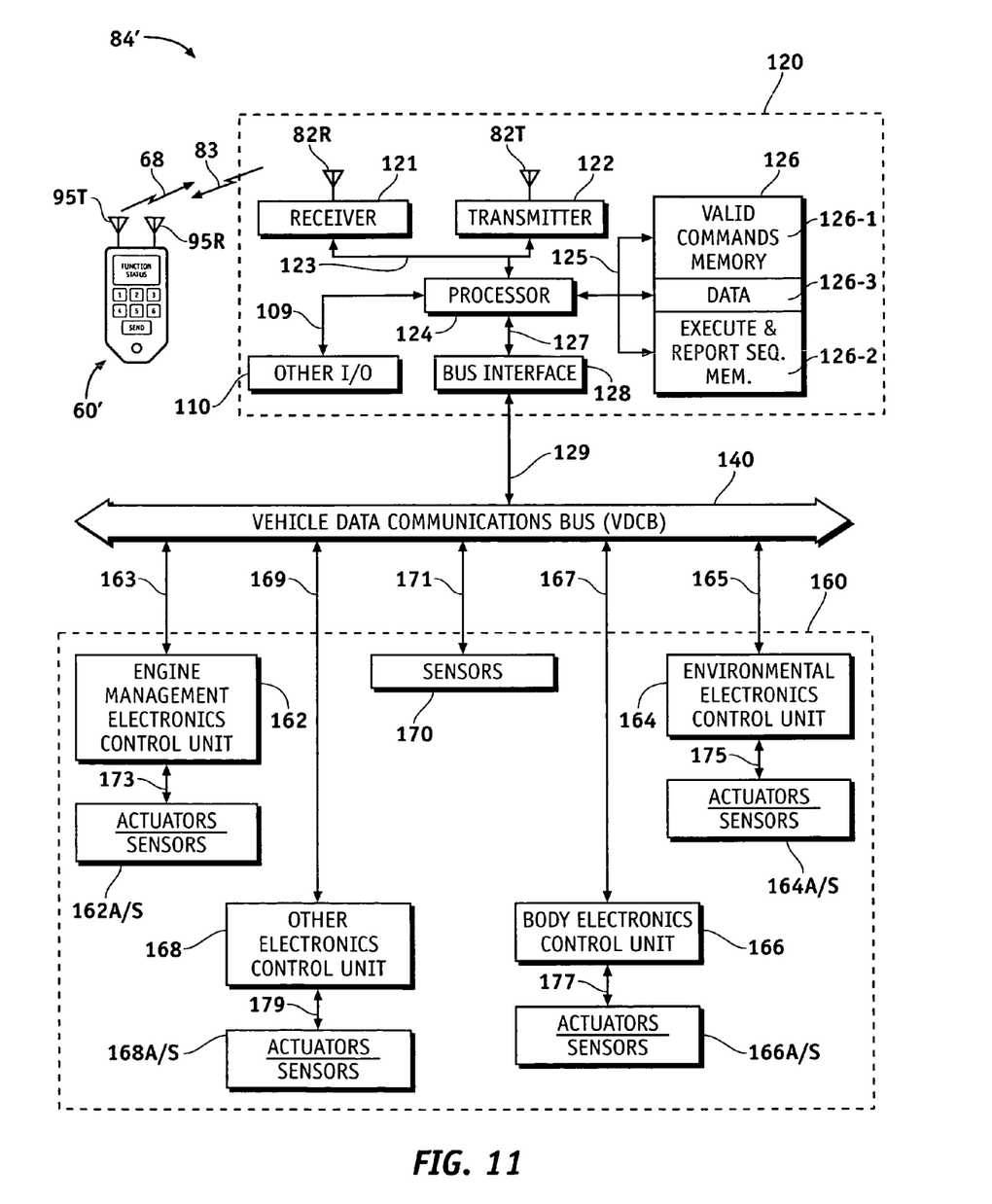
FIG. 11 is a schematic diagram of the vehicle electronics system of FIG. 10 according to another exemplary embodiment of the present invention.

FIG. 11 is a schematic diagram of vehicle electronics system (VES) 84' analogous to VES 84 of FIG. 10 in accordance with another exemplary embodiment. In this illustration, greater detail is provided for the interaction with remote control feedback fob 60' that is analogous to fob 60 of FIGS. 3-8. More specifically, fob 60' is shown as employing two antennas 95. Antenna 95T is provided for transmitting signal 68 and antenna 95R is provided for receiving signal 83, but this is merely for convenience of illustrating a further variation of the exemplary embodiment of the present invention and not intended to be limiting. Vehicle electronics system 84' is also illustrated as employing separate receive antenna 82R and transmit antenna 82T instead of combined antenna 82 of FIG. 10. A single antenna serving a single transceiver may be used or separate antennas serving the receiver and transmitter or a combination thereof may also be used in accordance with the present invention.

Vehicle electronics system (VES) 84' comprises fob interface module 120 and vehicle control system 160 that intercommunicate via vehicle data communications bus (VDCB) 140. Vehicle control system 160 includes, but is not limited to, various subsidiary electronic control units (ECUs). For example, vehicle control system 160 can include engine management control unit 162, environmental control unit 164, body electronics control unit 166 and other ECUs 168.

Fob interface module 120 includes, but is not limited to, receiver 121 coupled to antenna 82R for receiving fob signal 68, and transmitter 122 coupled to antenna 82T for transmitting vehicle wireless feedback signal 83 to fob 60. Receiver 121 and transmitter 122 are coupled via bus or leads 123 to processor 124. Other I/O 110 is coupled to processor 124 via leads or bus 109 and provides a pathway for commands originating from other sources other than fob 60. Processor 124 interprets the demodulated commands from receiver 121 or other I/O 110 and generates the appropriate responses to be returned via transmitter 122 or other I/O 110. Processor 124 is coupled via bus or leads 125 to memory 126 that is configured to store information such as execution routines, code tables and data. Portion 126-1 is referred to as the VALID COMMANDS MEMORY that is preferably utilized to store the identity of fobs whose commands can be executed and those commands that a particular fob 60 is permitted to execute. This prevents fobs from another vehicle improperly addressing controller 84, 84' or even the fob for vehicle 80 from commanding undesired or prohibited command actions.

Portion 126-2 is referred to as the EXECUTE & REPORT SEQUENCE MEMORY, which is conveniently used to store the subroutines for executing a particular command and/or determining whether any intermediate sensor values should be reported back to fob 60. For example, an environmental command that would involve energizing the air conditioning system generally has an engine start as a prerequisite to powering-up the climate control compressor. Hence, the execute sequence for such an environmental command could include, for example: (i) start engine, (ii) set fast idle, (iii) turn-on A/C compressor, (iii) turn on blower, (iv) set temperature control point, (v) measure interior temperature every X minutes, (vi) report intermediate temperature values to fob, . . . (n) report reaching temperature end point.

Processor 124 is coupled to bus interface unit 128 via bus or leads 127, which is in turn coupled to VDCB 140 via leads or bus 129. Processor 124 causes the commands received from fob 60 to be executed by communicating with other vehicle subsystems (e.g., ECUs 162, 164, 166, 168, etc.) via bus interface unit 128 and VDCB 140. While processor 124 is shown as being directly coupled to other elements of fob interface module 120 by various leads or buses 109, 123, 125, 127, this is merely for convenience of explanation and not intended to be limiting. Such elements can be coupled to each other and to bus interface 128 via a common or shared bus or leads.

Vehicle control module 160 conveniently comprises various vehicle ECUs. For example, and without any intention of being limiting, engine management control unit 162, environmental control unit 164, body electronics control unit 166, other control units 168 and global sensors 170, are coupled by local busses or leads 163-171 to VCDB 140 and thereby to each other and fob interface module 120. Each ECU is preferably coupled by a local bus or leads to actuators and/or local sensors appropriate to its function. For example, engine management control unit 162 is coupled to engine management actuators/sensors 162A/S via bus or leads 173, environmental control unit 164 is coupled to environmental actuators/sensors 164A/S via bus or leads 175, body electronics control unit 166 is coupled to body electronics actuators/sensors 166A/S via bus or leads 177 and other control units 168 are coupled to their corresponding actuators/sensors 168A/S by bus or leads 179. While this particular arrangement of individual ECUs and their respective actuators and local sensors is convenient, it is not essential and any arrangement that allows signals to be passed from and to fob interface module 120 and the appropriate controllers, actuators and sensors may be used in accordance with the present invention.

Global sensors 170 coupled to VDCB 140 via bus or leads 171 are generally those sensors whose output is used by multiple ECUs, although this is not essential. In any case, the sensor status outputs that are to be fed back to fob 60 are preferably available on VDCB 140 by either bus 171 or from local sensors 162A/S, 164A/S, 166A/S, 168A/S via their respective ECUs 162, 164, 166, 168 and coupling buses 163, 165, 167, 169. Further, while system 84' of FIG. 11 shows memory 126 as being apart of fob interface module 120 and coupled directly to processor 124, this is merely convenient and not essential. Memory 126 could be, for example, coupled to processor 124 via VDCB 140 and/or be part of processor 124 and/or be shared with other vehicle sub-systems.

A command from fob 60 or via other I/O 110 is received and decoded in fob interface module 120. The corresponding execute/report sequence is preferably retrieved from memory 126 and sent via bus interface 128 and VDCB 140 to the appropriate controller(s) (e.g., one or more of ECUs 162, 164, 166, 168) in vehicle control system 160. The appropriate controller(s) executes the desired command and provides the appropriate sensor or status output on VDCB 140 to be retrieved by interface module 120, which is reported back to fob 60 by wireless signal 83 or to an alternate command originator via other I/O 110. In this way, the result can be made available to the user via display or annunciator 64, 67, 69, 70, or equivalents on fobs 60A-60E, or other command devices. The operation of the systems illustrated in FIGS. 9-11 will be more fully understood by reference to the method flow charts shown in FIGS. 13-15.

In general fobs 60 of FIGS. 3-8 communicate directly with vehicle 80 and do not have an unlimited direct radio communication range. FIG. 12 is a simplified functional block diagram of system 180 according to a further exemplary embodiment of the present invention adapted to be useable at longer distances and according to several variations. Portion 181 of system 180 is generally contained within vehicle 80 and the remainder is generally external to vehicle 80. Portion 181 contains vehicle electronics system (VES) unit 191, which is analogous to VES units 84, 84', interface unit 190, optional vehicle cell phone 189, and optional electronic control unit (ECU) or equivalent 197. In general, cell phone 189 is coupled to VES 191 via interface unit 190 and/or ECU 197 is coupled directly to VES 191. ECU 197 preferably has a built-in cell phone that interfaces to the vehicle bus that is part of VES 191, which is analogous to bus 140 of VES 84' shown in FIG. 11. System 180 uses cell phone 184 and/or personal computer (PC) or personal digital assistant (PDA) 192 as remote control devices to control operation of vehicle 80 at much larger distances than would be possible with fob 60. Cell phone 184 and PC/PDA 192 serve the same function as fob 60 as far as originating commands and receiving and displaying or announcing the command results fed back from vehicle 80, and are capable of the full range of control functions already described in connection with fob 60.

Consider first branch 182 of system 180 utilizing cell phone 184 and its associated network for the entire communication link to vehicle 80. The user activates cell phone 184 in the usual manner and places a call via cell network 187 to vehicle cell phone 189 or via network 185, 196 to the cell phone embedded in ECU 197. Vehicle cell phone 189 or ECU 197 is programmed to answer and, for example, return a tone indicating that it is ready to receive commands. Alternatively, the user may send a tone after cell phone 189 or ECU 197 has answered, telling cell phone 189 or ECU 197 and VES 191 that transmission of vehicle action commands are about to begin. The user conveniently issues commands to VES 191 via vehicle cell phone 189 and interface unit 190 or via ECU 197 by, for example, depressing a particular combination of keys or speaking a particular voice command into cell phone 184. Alternatively, the user can activate cell phone 184 and execute an embedded software application in the cell phone. This alternative allows the user to select the desire remote functions and send the selected command.

Once the command is selected and sent, cell phone 184 will utilize the standard wireless mobile internet interface and send the command, for example, via TCP/IP to cell phone 189 or the cell phone embedded in ECU 197. In either case, processor 92, 124 as shown in FIGS. 10-11 of VES unit 191 receives the commands via other I/O 110 and interprets and executes them in generally the same way as if received from fob 60. Command status feedback is returned to cell phone 184 over the same network path as the incoming commands, and cell phone 184 is conveniently programmed to display the results on its built-in display 184D. Even if cell phone 184 is a very simple device whose display cannot be programmed to visually show the feedback status results, VES 191 can send back an audio message stating the results to be played by cell phone 184, just as described in the case of fob 60C. In either case, the user can send the desired command and receive visual feedback, audible feedback, or a combination of visual and audible feedback of the result.

In an alternate exemplary embodiment illustrated by path 183, personal computer (PC) or personal digital assistant (PDA) 192 is used for the input function. PC/PDA 192 is in radio communication via link 192-1 with Wi-Fi network 194, which in turn is coupled to internet 195, or is in wireline communication via link 192-2 with internet 195. In either case, data transmissions originating in PC/PDA 192 are routed via internet 195 to cell network 187 and/or network 196. PC/PDA 192 dials vehicle cell phone 189 or ECU 197, which are coupled via wireless links 187-1 and 196-1, respectively, with cell network 187 and network 196. When vehicle cell phone 189 or ECU 197 answers, depending on which path is used, commands issued by PC/PDA 192 are transferred to VES 191 (e.g., via input 110 of system 84, 84' as shown in FIGS. 10-11), and the commands issued by PC/PDA 192 are interpreted and executed, and execution status information is fed back to PC/PDA 192 over the same path. PC/PDA 192 then displays the resulting vehicle status. In addition to issuing commands to vehicle 80 and receiving feedback on the results, PC/PDA 192 and cell phone 184 may also be used to alter data (e.g., execution sequences, reporting parameters and frequency, allowed commands, etc.) stored in VES 191, as for example, in memory 104, 126 as shown in FIGS. 10-11.

Figure 13:
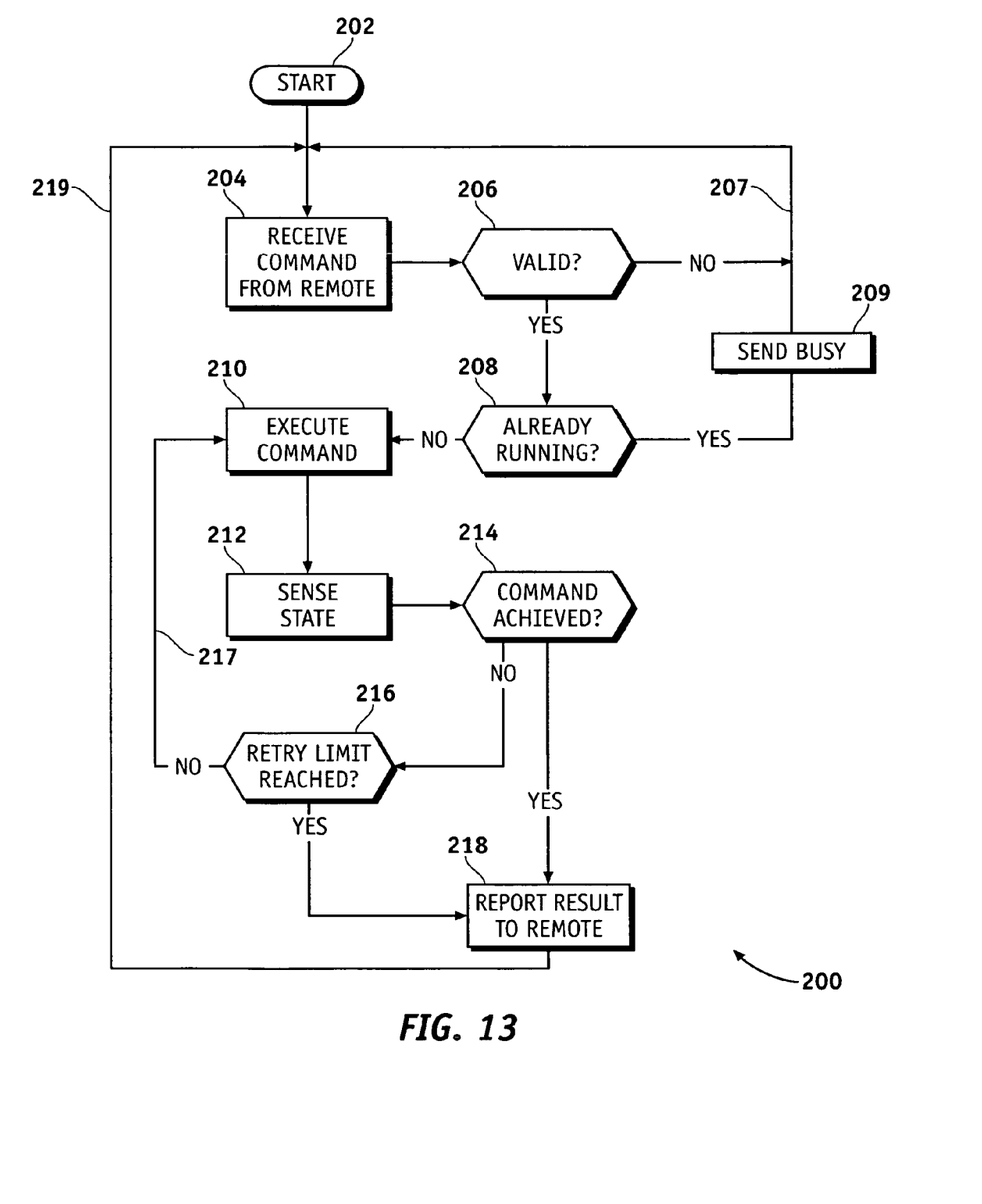
FIG. 13 is a simplified flow chart of a method according to a further exemplary embodiment of the present invention.
Figure 14:
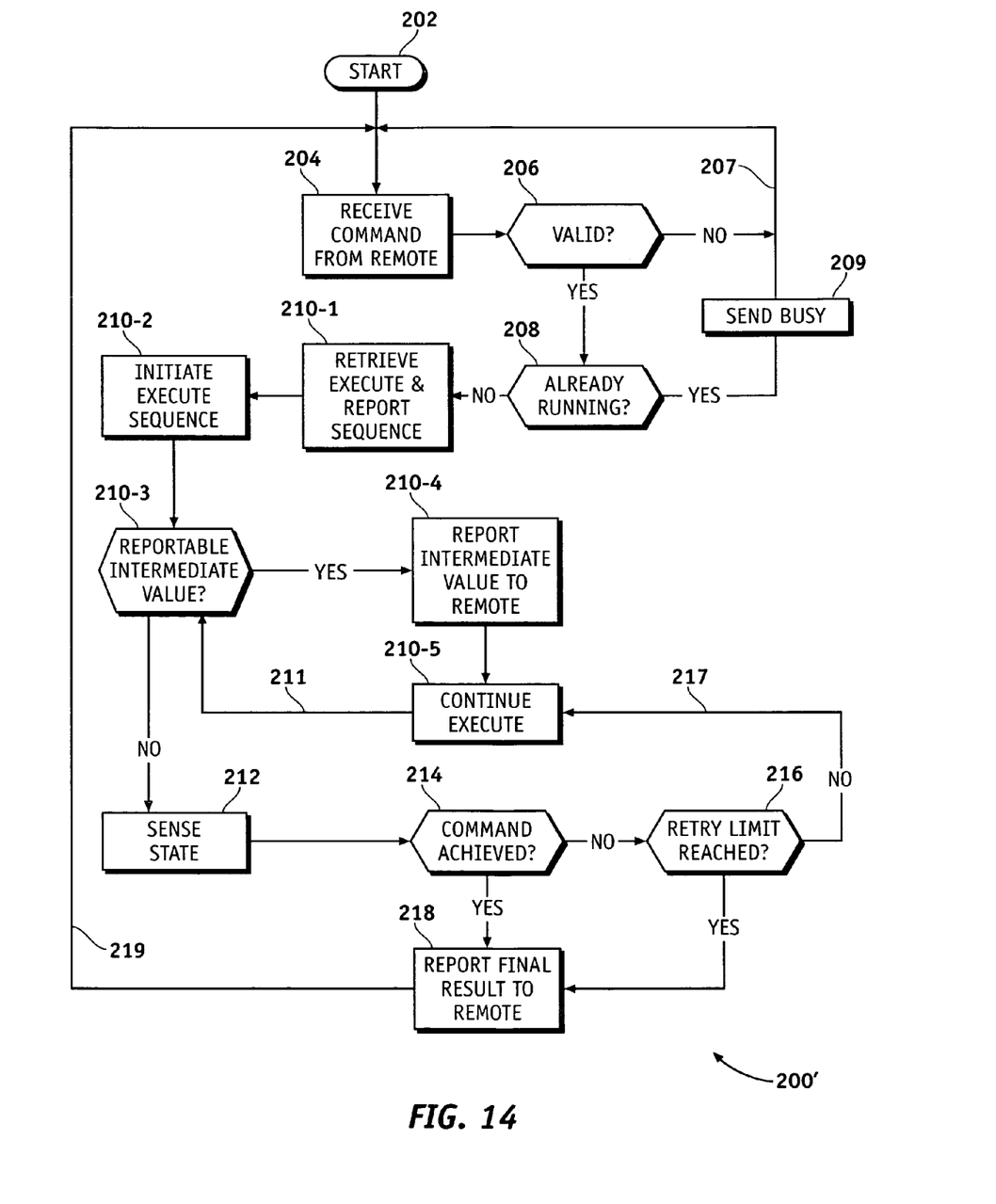
FIG. 14 is a simplified flow chart of a method according to yet another exemplary embodiment of the present invention.

FIG. 13 is a simplified flow chart of method 200 of the exemplary embodiment of the present invention according to a first exemplary embodiment and FIG. 14 is a further flow chart of method 200 designated as method 200' showing greater detail and additional features. The labels "NO" and "YES" on the figures correspond to logical NO or FALSE and logical YES or TRUE, respectively, to queries in these methods. The same reference numbers are used in FIGS. 13-14 to indicate steps common to both methods 200 and 200' and suffixes (e.g., 210-1, 210-2, etc.) are used to indicate that a step has been divided into various sub-steps and additional features.

Referring now to FIG. 13, method 200 begins with START 202 and initial step 204 when a command is received by vehicle electronics system 84, 84' via wireless signal 68 from fob 60 or by VES 191 from remote 184, 192. Vehicle electronics system 84, 84', 191 then executes queries 206, 208 in either order. In optional VALID ? query 206, it is determined (e.g., by reference to data stored in memory 104, 126) whether or not the particular fob or remote is authorized to send commands to this vehicle and whether the command received is among those authorized to be executed. If the outcome of query 206 is NO (i.e., FALSE), then as shown by path 207, method 200 loops back to start 202 and initial step 204. If the outcome of query 206 is YES (i.e., TRUE), indicating that both the fob or remote and the command are valid, then method 200 proceeds to ALREADY RUNNING ? query 208 where it is determined whether a command is already underway. This can occur, for example, if the user presses the same or another command button or function without waiting for execution of the first command to complete. If the outcome of query 208 is YES (i.e., TRUE), method 200 proceeds to optional SEND BUSY step 209, wherein fob 60 or remote 184, 192 provides notification that an incomplete command is already running, and then, as shown by path 207, and method 200 loops back to start 202 and initial step 204. If the outcome of query 208 is NO (i.e., FALSE), indicating that a command is not already running, then method 200 proceeds to EXECUTE COMMAND step 210 where the execute sequence that is retrieved from memory 104, 126 is passed to the appropriate controller for execution.

Following step 210, SENSE STATE step 212 is executed with a query of the appropriate sensor or status log (e.g., identified from memory 104, 126) to determine the current state of the system or subsystem being addressed. In subsequent COMMAND ACHIEVED ? query 214, the reported state is compared with the commanded state to determine whether or not the commanded state has been achieved. If the outcome of query 214 is NO (i.e., FALSE), which indicates that the desired end state has not yet been achieved, method 200 proceeds via optional RETRY LIMIT REACHED ? query step 216 where a determination is made as to whether a predetermined re-try limit has been reached. If the outcome of query 216 is NO (FALSE) then, as shown by path 217, method 200 loops back to execute command step 210 wherein execution continues.

Method 200 repeats steps 210, 212, 214, 216 until either step 214 or step 216 yields YES (i.e., TRUE). Either the commanded state has been achieved or the commanded state has not been achieved, but the re-try limit has been reached (YES (i.e., TRUE) to 216), whereupon method 200 proceeds to REPORT RESULT TO REMOTE step 218. In step 218, the outcome of SENSE STATE step 212 is sent back to fob 60 via signal 83 or to remote 84, 192 via paths 182, 183, reporting either success (YES (i.e., TRUE) to 214) or failure (YES (i.e., TRUE) to 216) as the case may be. Following step 218, method 200 returns to START 202 and first step 204 as indicated by path 219.

Referring now to FIG. 14, method 200' is presented wherein like numbered steps are the same or analogous to those of FIG. 13 and wherein step 210 is expanded into steps 210-1 through 210-5. Following a NO (i.e., FALSE) outcome of query 208, step 210-1 is executed with an execute and report sequence corresponding to the command received from fob 60 or remote 184, 192 that is retrieved from memory 104, 126. In step 210-2, this execute sequence is initiated. In query 210-3 it is determined whether, according to the retrieved sequence, there are intermediate values of sensed or measured or stored variables that are to be reported, as for example a current temperature reading before or after turning on the air conditioning system in the vehicle, or the engine temperature before or after an engine start, or whatever sensor or status output is built into the execute/report sequence retrieved from memory. If the outcome of query 210-3 is YES (i.e., TRUE), then method 200' proceeds to step 210-4 where the intermediate state or appropriate sensor readings or stored values are reported to fob 60 via fob interface module 120 or remote 184, 192 by VES 191. Following reporting step 210-4, method 200' proceeds to CONTINUE EXECUTE step 210-5 from which it returns via path 211 to query 210-3. Method 200' repeats steps 210-3, 210-4, 210-5 until a NO (i.e., FALSE) outcome results from query 210-3 and it proceeds to SENSE STATE step 212 as before in method 200.

Following step 212, queries 214, 216 are executed and if both queries 214, 216 result in NO (i.e., FALSE) outcomes, then method 200' loops back to step 210-5 as shown by path 217. If either of queries 214, 216 yields a YES (i.e. TRUE) outcome, then method 200' proceeds to REPORT RESULTS TO REMOTE step 218 (e.g., to fob 60 or cell phone 184 or PC/PDA 192, etc.) and recycles back to START 202 via path 219, the same as for method 200.

Figure 15:
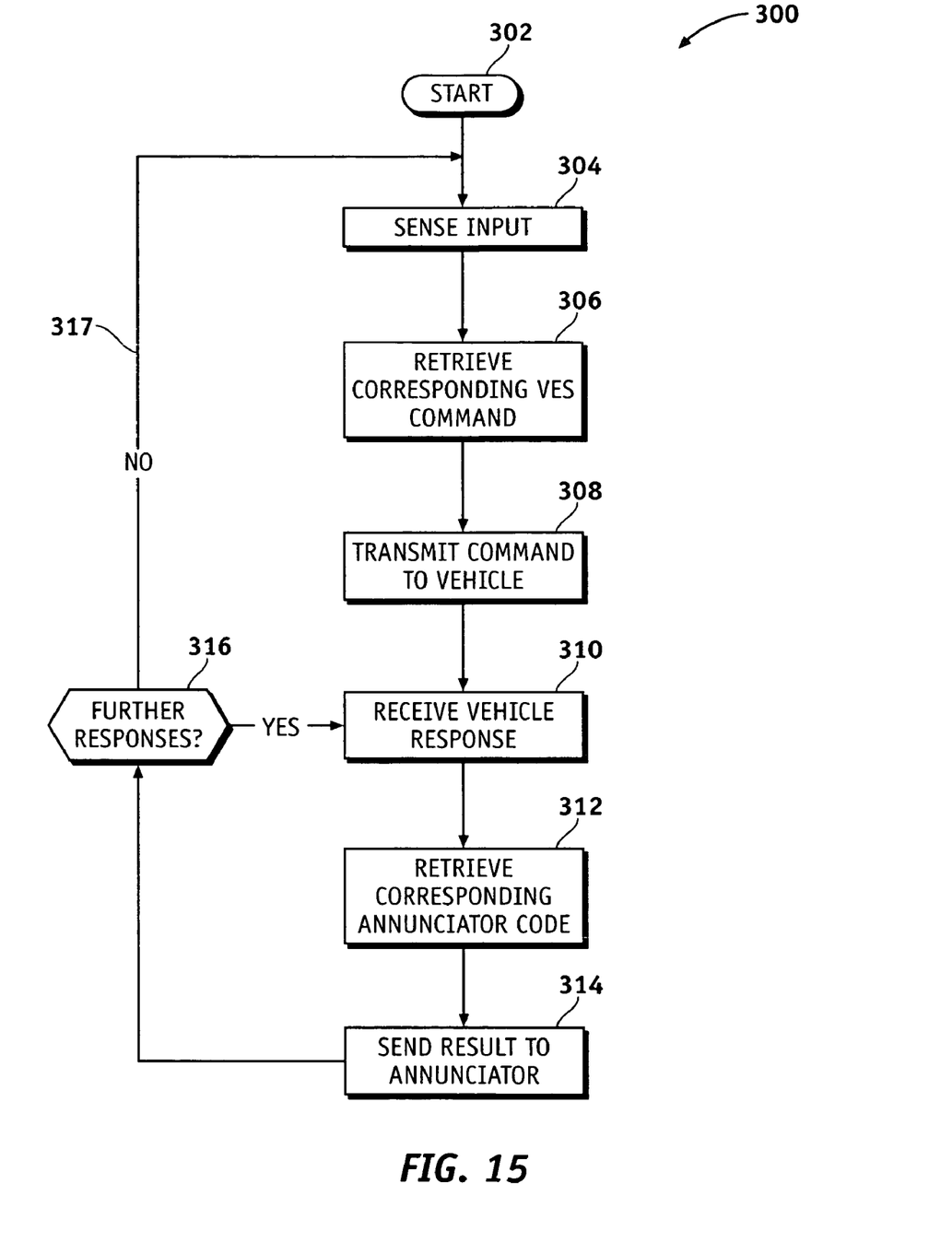
FIG. 15 is a simplified flow chart of a method according to still another exemplary embodiment of the present invention.

FIG. 15 is a simplified flow chart of method 300 of another exemplary embodiment of the present invention. Methods 200, 200' and 300 differ in that methods 200, 200' concern operations performed primarily by vehicle electronics system 84, 84' while method 300 concerns operations performed primarily by fob 60 or remotes 184, 192. For convenience of illustration operation of method 300 is described in terms of functions performed by circuit elements 90 of fob 60. However, the elements capable of performing analogous functions are present in cell phone 184 and PC/PDA 192.

Referring now to FIG. 15, method 300 begins with START 302 and initial step 304 in which input keystrokes or voice commands or other activations by the user are sensed, such as from input 91 operating in conjunction with processor 92 as shown in FIG. 9. Processor 92 uses the keystrokes, voice input or other activation received from input 91 and in step 306 retrieves from memory 93 the vehicle electronics system (VES) command(s) corresponding to those keystroke(s) or voice commands, etc.

For example, if button 62-2 of fob 60B as shown in FIG. 5 is intended to cause an engine start, then in step 306, processor 92 retrieves from memory 93 the code that will cause vehicle electronics system 84, 84' to carry out this action when button 62-2 is activated. In step 308, this code is transmitted to vehicle 80 by transceiver 94 via signal 68 where it is received by transceiver 100 or receiver 121. Receipt of this command signal from fob 60 corresponds to step 204 in method 200, 200'. In step 310 of method 300, transceiver 94 of fob 60 receives signal response 83 from vehicle electronics system (VES) 84, 84' and demodulates signal 83 to obtain the response code sent by VES 84, 84'. In step 312, processor 92 uses this response code to retrieve from memory 93 or otherwise calculate the annunciator code for the display and/or audio presentation that represents to the user the results corresponding to the result code obtained from VES 84, 84' of vehicle 80 (e.g., has the engine started). In step 314, this information is sent to annunciator 64, 67, 69, 70, etc., so as to be available to the user. Method 300 then proceeds to optional query 316 where it is determined whether or not the result received from VES 84, 84' is an intermediate result or a final result. In other words, are further responses from VES 84, 84' expected in connection with the command originated by fob 60. The information needed to make this determination is preferably included in the response code feedback by VES 84, 84'. This is possible since the execute and report sequence retrieved in step 210-1 of method 200', for example, can indicate whether multiple results are to be sent back to fob 60. If the outcome of query 316 is YES (i.e., TRUE), then method 300 loops back to receive further vehicle response(s) in step 310. Steps 310-314 are repeated until the outcome of query 316 is NO (i.e., FALSE), whereupon method 300 returns to start 302 and initial step 304 as shown by path 317.

Thus, persons of skill in the art will understand based on the description herein that methods 200, 200' and method 300 are to be read together since they describe portions of a process for generating vehicle control commands in a portable controller (e.g., a fob, cell phone, PC/PDA or other remote control), at least partly wirelessly transmitting them from the controller to a vehicle spaced apart from the controller, and at least partly wirelessly feeding back interim (optional) and final command status information from the vehicle to the controller, where this information is displayed for the user audibly, visually or both. It will be apparent to persons of skill in the art based on the description herein, that method 300 also applies equally well to cell phone 184 and/or PC/PDA 192 and the description of method 300 in terms of fob 60 is intended to also apply to the situation where the command originates from cell phone 184 or PC/PDA 192.

From the foregoing description it will be apparent that the system and method of the exemplary embodiment of the present invention provides the user of fob 60 or other remote device 184, 192 in connection with vehicle electronics system 84, 84', and 191 considerable flexibility of operation. For example, and not intended to be limiting, the user may enter parameters (e.g., desired temperatures, light levels, etc.) into fob 60 or other remote device 184, 192 and transmit these to vehicle 80 in connection with a command to perform a related function. Further, the user may, by means of such parameters and available commands, instruct vehicle 80 to report sensor readings of interest, e.g., outside temperature, inside temperature, rain, freezing conditions, engine speed, lock status, alarm status, and so forth. By operating switches 62, for example in pairs, a much larger number of command codes are available, each command code corresponding to a particular execution sequence stored in memory in vehicle 80. Thus, six switches 62 used singly provide six possible command codes, but when used in pairs, 6*5=30 possible command codes are available. Use of dial-wheel 74, 74' also conveniently provides a large number of choices, either alone or in conjunction with display 64D, 64E and/or annunciator 70.

A virtue of the exemplary embodiment of the present invention is that display 64D, 64E and/or annunciator 70 of fob 60 or other remote device 184, 192 can be used to display or present the command codes available to be selected and the switch combinations needed to select them. Thus, the user need not remember the large number of available command codes, but can select the ones desired by referring to the display and/or annunciator and activating the switches or providing voice commands as directed thereon. Thus, a large number of functions can be directed by the fob or other remote of the exemplary embodiment of the present invention without burdening the user with a remembering them all. Further the feedback and display and/or annunciator on fob 60 or other remote device 184, 192 informs the user as to the result of the command or inquiry transmitted by fob 60 or other remote device 184, 192 to the vehicle. These are particular features of the exemplary embodiment of the present invention. Further, by utilizing available cell phone networks, WiFi networks and the Internet, control of the vehicle and results feedback can be achieved without regard to the distance separating the user from the vehicle. This is a particular feature of such further exemplary embodiment of the present invention.

In addition, while many aspects of the exemplary embodiment of the present invention have been described in terms of using a fob or other electronic key or a Cell-Phone or a PDA or a PC as a portable remote, this exemplary embodiment of the present invention applies equally well to any type of portable signaling device capable of receiving user inputs, transmitting signals that are at least partly wirelessly communicated to the vehicle, receiving feedback transmitted at least partly wirelessly from the vehicle to the portable device, and displaying or announcing (or both) feedback results in a manner apparent to the user. Accordingly, the word "remote" is intended to include all such signaling devices and not be limited merely to fobs, PDAs, PCs, Cell Phones, etc., illustrated herein. Further, as used herein, the term "annunciator" is intended in its broadest sense to include both visual and/or audible presentations of information. Thus, for example, and not intended to be limiting, an "annunciator" may comprise one or more indicator lamps or other illuminating device(s), an alphanumeric display, a light bar, a loud speaker, a horn, a buzzer, a tactile vibrator or other sound or vibration making device, and any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A portable control device configured to provide an operator with control of an operation of a vehicle, comprising:
   an input configured to receive an action of the operator that is indicative of the operation to be performed by the vehicle;
   a transmitter configured to send a first signal via an at least partly wireless connection with the vehicle that at least partially embodies a command for the action of the operator received by the input;
   a receiver configured to receive a second signal via the at least partly wireless connection with the vehicle that at least partially embodies feedback from a sensor of the vehicle indicative of the operation resulting from the command at least partially embodied by the first signal sent by the transmitter; and
   a light bar configured to present information to the operator on the operation based at least in part on the feedback in the second signal received by the receiver;
   wherein the portable control device is a keyfob, and wherein the vehicle emits a temperature signal indicative of temperature associated with the vehicle, and wherein the portable electronic device further comprises a processor operatively coupled to the receiver and to the light bar, the processor configured to: (i) receive the temperature signal via the receiver, and (ii) adjust the illumination of the light bar in accordance with the temperature signal.

2. The portable control device of claim 1, wherein the at least partly wireless connection comprises a cell phone or Internet connection.

3. The portable control device of claim 1, wherein the portable control device is configured to send instructions to the vehicle altering the vehicle's response to subsequent commands.

4. The portable control device of claim 1 wherein the input comprises one or more user actuated functions that cause available operations that can be performed by the vehicle to be presented by the output so that the operator so can thereby select the particular operation desired to be performed by the vehicle.

* * * * *